S. GOLDSCHMIDT.
Surgical-Bandage.

No. 222,690.  Patented Dec. 16, 1879.

WITNESSES:
Carl Karp
Otto Risch

INVENTOR:
Samuel Goldschmidt
BY Paul Goepel
ATTORNEY.

UNITED STATES PATENT OFFICE.

SAMUEL GOLDSCHMIDT, OF BERLIN, PRUSSIA, GERMAN EMPIRE.

IMPROVEMENT IN SURGICAL BANDAGES.

Specification forming part of Letters Patent No. 222,690, dated December 16, 1879; application filed July 21, 1879.

*To all whom it may concern:*

Be it known that I, SAMUEL GOLDSCHMIDT, of Berlin, Prussia, German Empire, have invented an Improved Surgical Bandage, (cataplasm,) of which the following is a specification.

Figure 1:
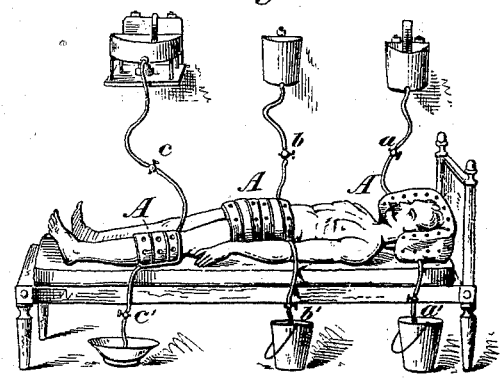
Figure 2:
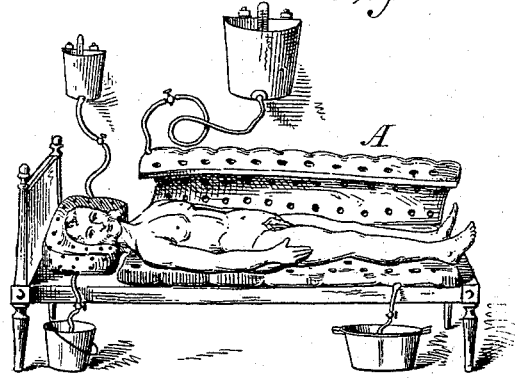
Figure 3:
Figure 4:
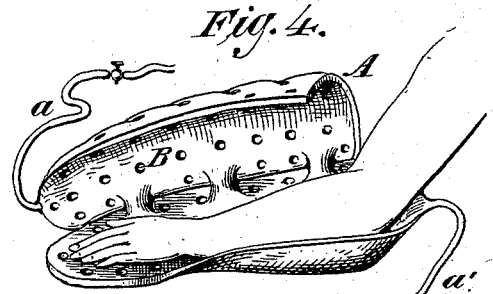
Figure 5:
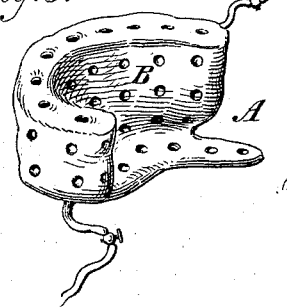
Figure 6:
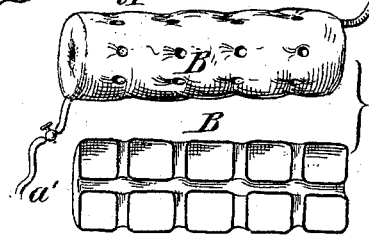
Figure 7:
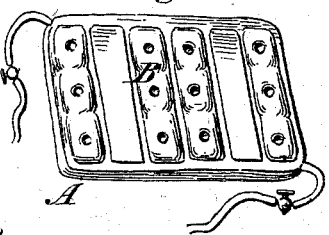
Figure 8:
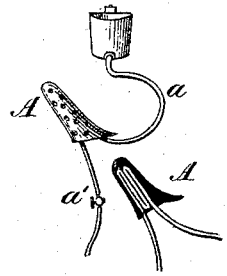
Figure 9:
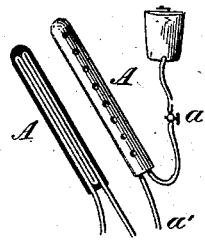

In the accompanying drawings, Figures 1 and 2 represent perspective views of my improved surgical bandage, shown as applied, respectively, to a part of and to the entire body. Figs. 3, 4, 5, 6, 6$^a$, 7, 8, and 9 are detail views of the bandage, shown as adapted to be applied, respectively, to the leg, arm, abdomen, head, vagina, rectum, or other part of the body.

Similar letters of reference indicate corresponding parts.

This invention relates to improved ventilating bandages for cooling or heating any part of or the entire body in a clean, uniform, and reliable manner; and the invention consists of bandages of water-proof material having ventilating openings or passages.

In the drawings, A represents my improved bandage, which is made in the shape of a cushion of elastic and water-proof material, and of any desired shape, large or small, so as to be adapted for any part of or for the entire body. The bandage is of greater or less thickness, and provided either with tubes or openings B, according to the thickness of the bandage. These tubes or openings pass transversely through the bandage, and admit the passage of the air to the inside of the same. One end of the bandage is connected by a tube, *a*, *b*, or *c*, with an elevated supply-reservoir containing warm or cold water, the temperature of which is regulated by means of ice for cold applications, or by a spirit-lamp and thermometer for warm cataplasm. At the lower end or part the water is conducted off by a discharge-tube, *a'*, *b'*, or *c'*, which leads to a suitable vessel. Both the inlet and outlet tubes are provided with stop-cocks for properly regulating the circulation of water.

The transverse ventilating tubes or openings B have not only the advantage of admitting atmospheric air, but also of admitting the escape of vapor, &c. They further effect a better distribution of the water, so that a more uniform temperature throughout the entire bandage is obtained. The openings also admit the application of cooling, disinfecting, or other medicaments, such as carbolic acid, &c., without being obliged to take off the bandage.

My improved ventilating-bandages have the following advantages: First, the bandage can remain permanently in position, and need not be changed, so as to annoy the patient; second, the temperature of the bandage can be accurately regulated; third, the bandage incloses entire parts, and fits snugly and comfortably thereto; fourth, full ventilation by access of air and escape of vapors is obtained; fifth, the bandage exerts no pressure, owing to its reduced size; sixth, it forms in many cases an effective and convenient substitute for the permanent baths applied to the entire body or parts thereof.

I am aware that bandages formed of double walls, between which a cooling or heating medium passes, are well known, and I do not claim the same, broadly.

Having thus described my invention, I claim as new and desire to secure by Letters Patent—

A surgical bandage formed of double walls of water-proof material, said walls being connected by a number of transverse passages, which provide openings for the access of air to the skin, and around which the liquid circulates, substantially as and for the purpose set forth.

In testimony whereof I have signed my name to this specification in the presence of two subscribing witnesses.

SAMUEL GOLDSCHMIDT.

Witnesses:
H. KREISMANN,
EDWARD P. MACLEAN.